Figure 1:
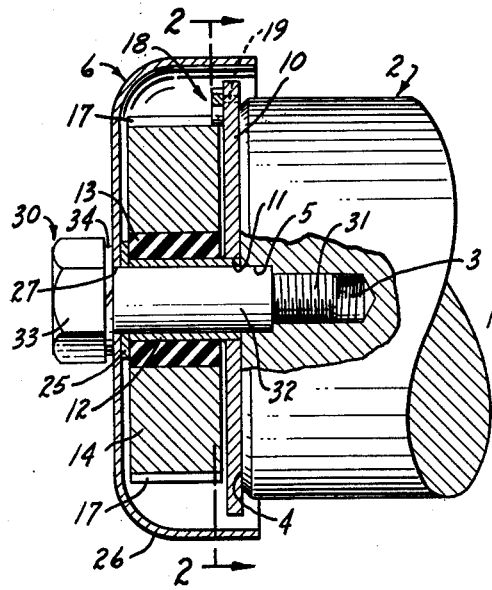

March 24, 1964  J. K. VALUS  3,125,983
TORSIONAL VIBRATION ALARM

Filed Sept. 19, 1960  3 Sheets-Sheet 1

INVENTOR.
James K. Valus,
BY Parker & Carter
Attorneys.

March 24, 1964 J. K. VALUS 3,125,983
TORSIONAL VIBRATION ALARM
Filed Sept. 19, 1960 3 Sheets-Sheet 2

INVENTOR.
James K. Valus,
BY Parker & Carter
Attorneys.

March 24, 1964   J. K. VALUS   3,125,983
TORSIONAL VIBRATION ALARM
Filed Sept. 19, 1960   3 Sheets-Sheet 3

INVENTOR.
James K. Valus,
BY Parker & Carter
Attorneys.

United States Patent Office 3,125,983
Patented Mar. 24, 1964

3,125,983
TORSIONAL VIBRATION ALARM
James K. Valus, Milwaukee, Wis., assignor to Nordberg Manufacturing Company, Milwaukee, Wis., a corporation of Wisconsin
Filed Sept. 19, 1960, Ser. No. 57,016
6 Claims. (Cl. 116—74)

This invention relates in general to a torsional vibration alarm and more particularly to a device for signaling the approach of destructive forced vibrations in a rotating crankshaft.

It is well known that rotating shafts in machinery, engines for example, at certain speeds called critical speeds, become dynamically unstable and large vibrations are likely to develop. This phenomenom is due to resonance effects and a critical speed is that speed at which the number of revolutions per second of the shaft is an integral factor (exact divisor) of the natural frequency of the shaft system in cycles per second. In a case where a pulsating torque is acting on the shaft, as the frequency of the torque approaches one of the frequencies of natural vibration, a resonance condition develops and heavy forced torsional vibration is produced. These frequencies of natural vibration can be calculated in a well-known manner. In the case of a crankshaft where a number of rotating masses are arranged on the shaft, approximate graphical and numerical methods are usually applied in calculating these frequencies.

In machinery utilizing a rotating shaft as an integral part thereof, such as a reciprocating engine, gas turbine, or air compressor or the like, heavy forced torsional vibration produced in the rotating shaft when such a critical speed is reached can rapidly cause extensive damage to the shaft and shaft mounting. It is this critical speed and its calculable corresponding frequency of natural vibration (ordinarily designated $W_c$) which this invention is concerned with.

In the case of reciprocating engines, a damper is often used to modify the torsional vibration produced in the crankshaft. Any of a number of damper systems might be utilized. For example, an engine might be equipped with a viscous damper of the type shown in U.S. Patent No. 2,514,139. At any rate, regardless of the type of damper utilized, its objective is to modify the vibrations of the crankshaft to such an extent that they are not destructive by suppressing the amplitude of the forced vibration.

When a damper fails it normally does so without the knowledge of operating personnel, however. Consequently, upon reaching a predetermined critical speed, vibrations begin to rapidly develop to such an extent that considerable damage might be done to the engine before it can be throttled back.

In engines having no damping equipment whatsoever, it will be obvious that the threat of destructive vibration is always present. Though the operator is constantly aware of this threat, such vibrations can develop rapidly and since an engine is seldom under constant direct observation, damage frequently occurs before corrective measures can be taken.

Accordingly, it is a primary object of this invention to provide an alarm device for signaling the approach of heavy forced torsional vibration in a rotating shaft.

Another object is to provide an alarm which will signal the failure of a crankshaft damping system.

Still another object is to provide a torsional vibration alarm for a rotating shaft which indicates that a particular amplitude of a predetermined critical frequency has been reached.

Yet another object is to provide an alarm of the aforedescribed character which utilizes the difference in vibrations in a shaft which is undamped and a tuned flywheel on the shaft which is damped to produce the alarm signal.

Another object is to provide an alarm device which is simple and inexpensive to manufacture and may be readily mounted on a shaft such as a crankshaft at any adaptable spot therealong.

These and other objects of this invention will be readily apparent in the following specification and claims wherein like reference numerals identify like parts throughout.

Figure 2:
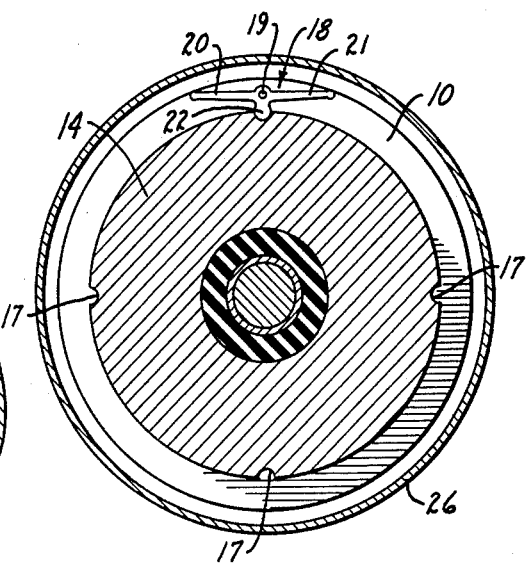
Figure 4:
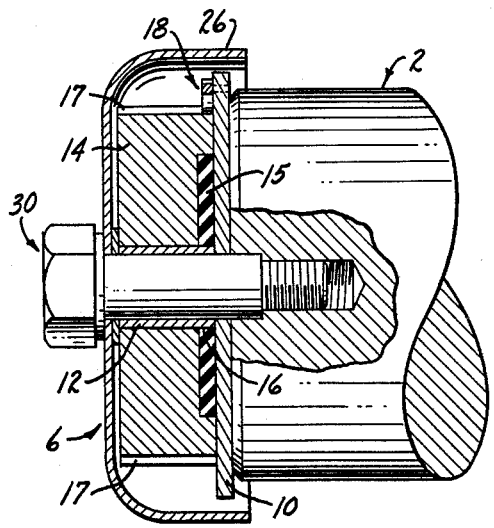
Figure 3:
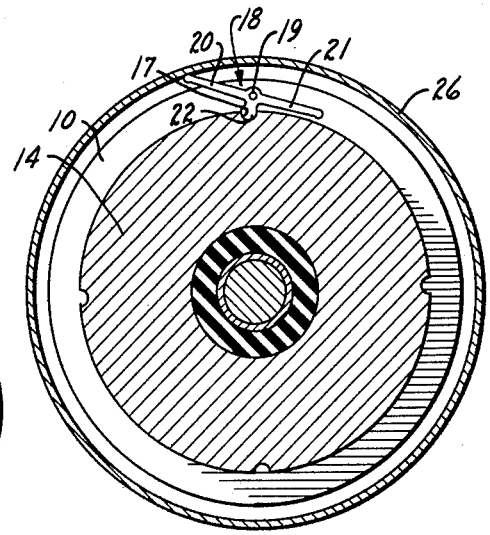
Figure 5:
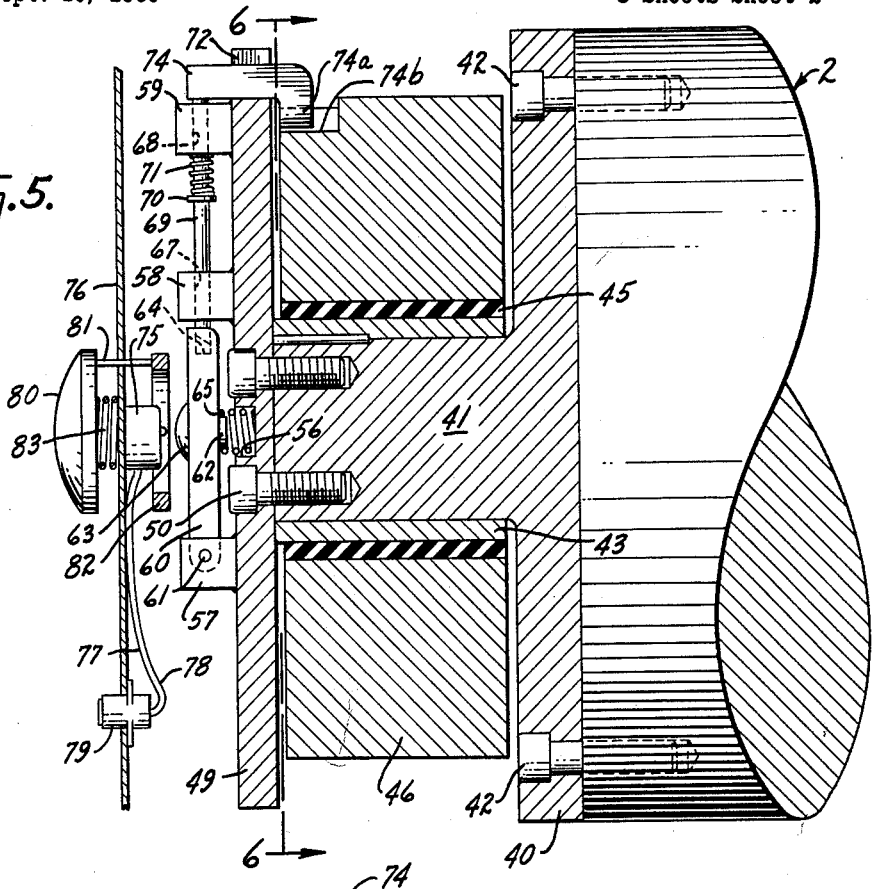
Figure 6:
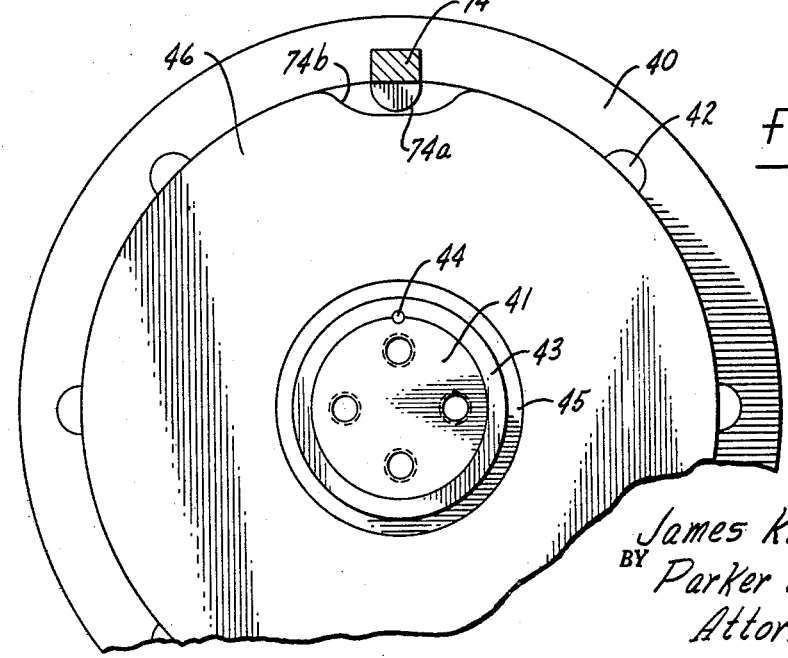
Figure 7:
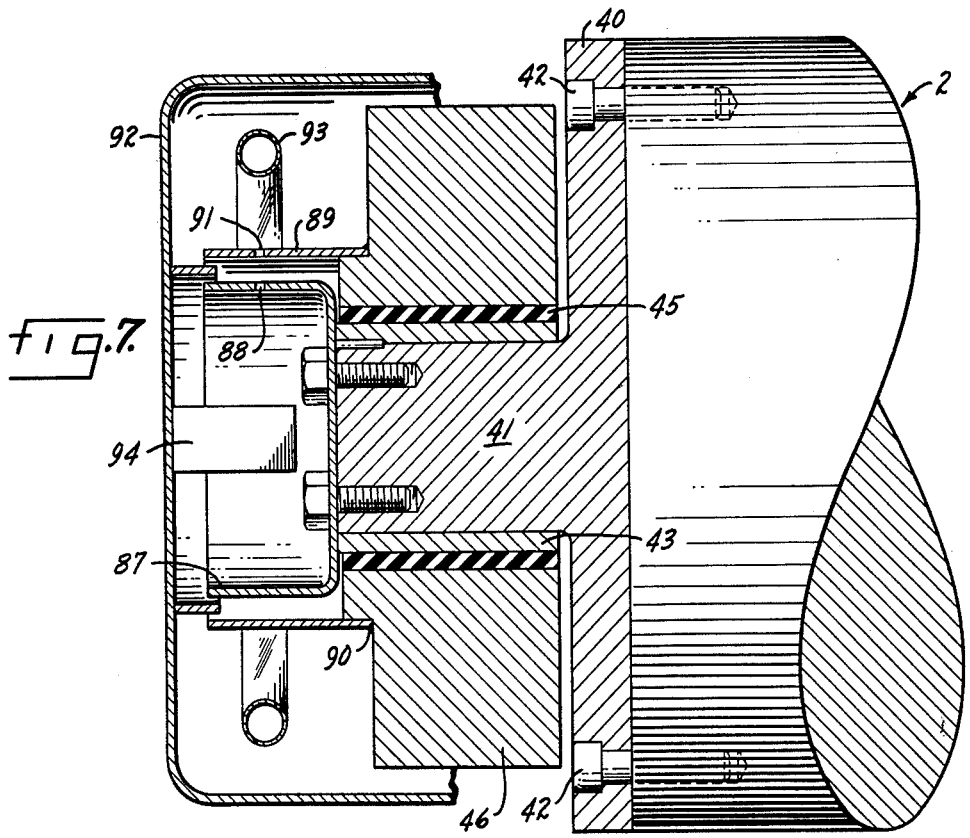
Figure 8:
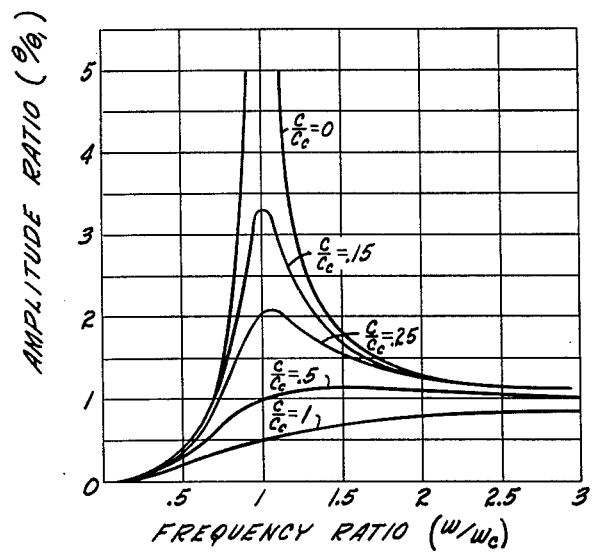

The invention is illustrated more or less diagrammatically in the drawings wherein several embodiments of this invention are illustrated:

FIGURE 1 is a side view in partial section with parts broken away showing the relationship between an alarm device and a conventional crankshaft, FIGURE 2 is a cross-sectional view taken along line 2—2 of FIGURE 1 showing the relationship of parts of this device at non-critical speeds, FIGURE 3 is a cross-sectional view similar to FIGURE 2 showing the device at critical engine speed, FIGURE 4 is a view similar to FIGURE 1 which shows a variant form of flywheel damper construction, FIGURE 5 is a partial sectional view of a modified form of the alarm device, FIGURE 6 is a partial cross-sectional view taken along line 6—6 of FIGURE 5, FIGURE 7 is a cross-sectional view of yet another modified form of this alarm device, and FIGURE 8 is a graph depicting the relationship between amplitude and frequency of vibration as a function of damping coefficient.

In the drawings, a conventional reciprocating engine crankshaft is indicated generally at 2. The alarm device embodying this invention might be mounted on the crankshaft in one of several ways without departing from the spirit of the invention. One such mounting means is shown in FIGURES 1–3. It includes an internally threaded bore 3 which extends into the flat end 4 of the shaft along the longitudinal axis thereof. An enlarged portion 5 forms the outer end of the threaded bore 3.

A device embodying this invention is indicated generally at 6. It includes a circular plate 10 having a circular cutout 11 extending through its center. The plate 10 lies flat against the end 4 of the shaft and the cutout 11 is concentric with the enlarged portion 5 of the internally threaded bore 3. A sleeve 12 fits snugly within the cutout 11 and is fixed thereto by conventional means such as welding or the like.

Surrounding the sleeve 12 and fixed to its outer surface is a sleeve-shaped rubber spring 13. A flywheel 14 surrounds and is fixed to the outer surface of the rubber spring 13 for rotation therewith. The rubber spring 13 and flywheel 14 are designed and constructed to rigid specifications dictated by the frequency of vibration ($W_c$), at a predetermined critical speed, of the rotating crankshaft. The significance of this relationship will be more fully developed in the discussion of use and operation of this invention.

As will be seen in FIGURE 4, the shape and construction of the rubber spring and flywheel combination can be varied to suit specific conditions. The rubber spring, for example, might be disc shaped, as is the spring 15. In such case, the disc would be fixed to the sleeve 12 around its periphery, as at 16, and the flywheel secured to the disc in any well-known manner for free movement relative to the sleeve 12 and the plate 10.

In the embodiment shown in FIGURES 1–4 a series of four semi-circular notches 17 are formed in the periphery of the flywheel 14 at evenly spaced intervals. Only one of the notches is actually utilized in the operation of this alarm device but the others are necessary to insure proper balance of the flywheel. In practice, however, any balancing means might be utilized.

In this embodiment a striker is indicated generally at 18. The striker is pivotally mounted on the plate 10 at 19 adjacent the outer periphery of the plate. The striker includes horizontally extending striker arms 20 and 21 and a downwardly extending actuating arm 22 having an arcuate surface which fits snugly in an aligned notch 17 for sliding movement therein.

Overlying the outer end of sleeve 12 is a washer 25. A cup-shaped bell 26 is seated on the outer face of washer 25 and has a circular cutout 27 extending through the center of its base and concentric with sleeve 12 and bore 3.

A bolt, shown generally at 30, includes a threaded end portion 31, an enlarged central portion 32 and a conventional head portion 33. Bolt 30 extends through the bell 26, washer 25, sleeve 12 and plate 10 into threaded engagement with internally threaded bore 3 of the shaft 2. A lock washer 34 between the head 33 and the outer surface of the bell 26 insures the maintenance of a fixed relationship between the bell 26, sleeve 12, plate 10 and shaft 2.

The flywheel, however, is permitted a certain degree of movement relative to the aforementioned elements by virtue of the fact that it is connected to the shaft 2 through the rubber spring 13. It consequently can cause movement of the striker 18 by moving relative to the plate 10. The bell 26 has its inner face separated from the striker arms 20 and 21 of the striker by a distance which can be calculated in a manner which will be hereinafter described.

Another embodiment of this invention is shown in FIGURE 5. In this embodiment a plate 40 having a centrally disposed extension 41 extending outwardly therefrom is secured to an end of the crankshaft by conventional means such as bolts 42. A sleeve 43 is secured to the extension 41 for rotation therewith by a key 44. Fixed to the outer periphery of the sleeve 43 is a rubber spring 45 similar to the rubber spring 13 previously described. A flywheel 46 is fixed to the outer periphery of the sleeve-shaped rubber spring 45 for rotation therewith.

A disc 49 is secured to the outer end of the extension 41 by bolts 50. A depression 56 is formed in the center of the outer face of disc 49. A series of three aligned projections 57, 58 and 59 are secured to the outer face, with the projections 57 and 58 straddling the depression 56 and the projection 59 in alignment with them and adjacent the outer periphery of the disc. An actuating arm 60 is pivotally connected to projection 57 as at 61. The actuating arm has a centering projection 62 on one side thereof in alignment with the depression 56 in plate 49. A raised portion 63 is formed on the opposite side of the actuating arm 60 and a detent slot 64 extends into the end of the arm opposite the pivotal connection 61. Coil spring 65 is seated in the depression 56 and extends into biasing engagement with arm 60 around centering projection 62.

Projections 58 and 59 have aligned bores 67 and 68, respectively, extending therethrough. A detent rod 69 having a centrally disposed stop 70 thereon extends through the bores 67 and 68 and is normally seated in the detent slot 64 at one end. A compression spring 71 extends between the projection 59 and stop 70 and tends to bias the rod 69 into slot 64.

An L-shaped cam follower 74 is fixedly secured to the outer end of rod 69 for movement up and down therewith. The cam surface 74a on the follower extends into a notch 74b of predetermined length in the outer periphery of the flywheel 46. The length of notch 74b and its relationship to the cam surface 74a are established according to specifications determined by calculations which will be discussed in the description of use and operation of the device. Cam follower 74 extends through slot 72 in the periphery of disc 49 which limits the movement of the cam to a vertical path.

An alarm switch 75 is mounted on adjacent structure which might be a cover 76 in a position such that raised portion 63 on actuating arm 60 will close the switch upon contact. The switch is connected by conventional leads 77 and 78 to an alarm circuit connector 79. This arrangement is shown only as an example, however, and any simple alarm circuit might be utilized.

A reset button 80 is slidably mounted in the cover 76 on pin means 81 which extends through the cover and carries a reset loop 82 at its inner end. A spring 83 biases the reset button 80 and consequently the loop 82 out of engagement with the actuating arm 60.

Yet another embodiment of this invention is shown in FIGURE 7. In this modification the extension 41 of plate 40 carries secured to its outer end a small cup-shaped element 87. An aperture 88 of predetermined length is formed in the wall of the cup 87. The flywheel 46 carries an enlarged sleeve 89 secured to its outer surface by conventional means such as welding or the like, at 90. Aperture 91 of predetermined length is formed in the enlarged sleeve 89 and is normally in alignment with the aperture 88 in cup 87.

A large cup-shaped cover 92 overlies the open end of the cup 87 and the sleeve 89 and has a circular light source 93 which might be a neon ring or the like secured to its inner periphery.

A conventional photoelectric cell 94 is mounted on the base of the cup-shaped cover 92 and extends into transverse alignment with the apertures 88 and 91. The lengths of the apertures 88 and 91 are calculated in a manner which will be hereinafter discussed.

Although this invention has been described primarily in connection with a rotating crankshaft, it will be understood that it might be utilized with a rotating shaft in many other settings. For example, a motor, generator or gas turbine or the like could as easily utilize the torsional vibration alarm to signal the approach of heavy vibrations.

The use and operation of this invention are as follows:

In constructing a torsional vibration alarm for the crankshaft of a conventional diesel engine, for example, the torsional natural frequencies of vibration of the crankshaft must first be calculated by conventional methods. As has been explained above, a crankshaft will have several natural frequencies of vibration, depending upon its configuration. As individual cylinders fire, torque is imparted to the crankshaft. The frequency or speed of the imparting torque and its harmonic component will successively approach and pass through the frequencies of natural vibration of the crankshaft. The points at which these frequencies coincide are resonance conditions and are termed critical speeds. Forced torsional vibration becomes greatest at these speeds. Engine designers are primarily concerned with a single natural frequency of necessity in the operating speed range of the engine. It is that critical speed with which this invention is primarily concerned.

Knowing the natural frequency ($W_c$) of the crankshaft as dictated by its configuration, the alarm device embodying this invention can be constructed. At a point on the crankshaft where it is apparent that the amplitude of the forced vibration is at its greatest, means can be provided for securing this device to the crankshaft. A device utilizing the principles of this invention might be secured to an end of the shaft or it might be mounted between the ends. The construction would necessarily vary to suit the mounting requirements without departing from the spirit of the invention.

In the first embodiment, shown in FIGURES 1–3, the plate 10, sleeve 12, washer 25 and bell 26 are rigidly secured to the end of the crankshaft 2 by bolt 30 and lock washer 34; the bolt extending into threaded relationship with the internally threaded bore 3. As a consequence of this arrangement, it will easily be seen that each of the aforementioned elements has imparted thereto the vibrations of the crankshaft 2. In like manner, the rubber spring 13 is fixedly secured to the sleeve 12 and the flywheel 14 is in turn fixedly secured to the outer periphery of the spring 13. The damping characteristics of the rubber spring, of course, affect the vibrations of the flywheel in a manner which can be calculated and is a function of the properties, size and configuration of the rubber spring and of the flywheel itself. The relationship which must be established between the flywheel and the crankshaft is broadly that of constructing the flywheel and rubber spring in such a manner that the frequency of natural vibration of the flywheel is equal to the frequency of natural vibration corresponding to the critical frequency of the crankshaft ($W_c$). This tuning is accomplished by constructing the flywheel and rubber spring according to specifications dictated by properties of the spring and flywheel equated by well-known formulae to the proper dimensions for such a tuned frequency.

The rubber spring acts as a vibration damper for the flywheel 14 and, depending upon its damping coefficient (C), which can be calculated in a well-known manner, it affects the amplitude of the vibrations of the flywheel 14 while having no effect on its frequency of vibration. The amplitudes of the flywheel and crankshaft will consequently be different at resonance frequency and this difference can be calculated. Thus, the amplitude ratio ($\theta/\theta_1$) can be calculated. The amplitude ratio, which is the relative amplitude of the flywheel and the crankshaft over the amplitude of the crankshaft can be plotted against the frequency ratio ($W/W_c$) which is the frequency of the crankshaft and flywheel over the critical or resonance frequency. The resulting curve will be different for every percentage of critical damping which the rubber spring damper produces. Since we can calculate the damping capability or coefficient (C) of our particular rubber spring and its ultimate or critical damping limit ($C_c$) by well-known formulae, knowing the characteristics and dimensions of the damping spring, the percent of critical damping ($C/C_c$) can be calculated. As will be seen then, in FIGURE 8, if the damping provided by the rubber spring is 25 percent of critical damping, the amplitude ratio between the crankshaft and the flywheel will be approximately twice the original crankshaft amplitude at the point where heavy forced torsional vibrations are most destructive.

When such a condition exists, it is a primary object of this device to indicate the onset of this relationship and consequently allow the operator to take corrective measures. In one embodiment of this invention, shown in FIGURES 1–3, this warning is provided by the striker arms 20 and 21 of striker 18 contacting the inside of bell 26. If, for example, the amplitude ratio hereinbefore discussed is approximately two at resonance, the amplitude of the striker, which is a function of the amplitude ratio, can be calculated and the length of the arms 20 and 21 and their relationship to the bell 26 adjusted so that they will come into contact as this ratio is approached at resonance frequency.

In FIGURES 5 and 6, another type of alarm device utilizing the principles of this invention is shown. In this case, an electrical alarm (not shown) can be actuated by the closing of switch 75. Switch 75 is closed by the movement of actuating arm 62 biased by spring 65 when rod 69 is pulled out of slot 64. Rod 69 will be pulled out of slot 64 against the bias of spring 71 when and if the cam follower 74 is forced upwardly by an end of the notch 74b contacting and lifting the cam surface 74a of the follower.

The length of the notch 74b in flywheel 46 is consequently constructed in relationship with the cam surface 74a to cause the cam follower 74 to move upwardly and pull rod 69 upwardly as a predetermined amplitude ratio is reached. The electrical alarm will then be sounded and the operator can decrease the speed of the engine, for example. The reset button 80 is constructed and arranged to return the actuating arm 60 to a position wherein pin 69 can again be seated in slot 64 after an alarm actuation has taken place, and the operator has taken corrective measures.

The alarm system shown in FIGURE 7 utilizes a conventional photoelectric cell 94 to actuate a bell, for example, or other warning means when the relative amplitude signaling the approach of destructive heavy forced vibrations at critical speed is reached. In this case, the cell is actuated to close a circuit when light from the circular light source 93 does not reach the cell through normally aligned apertures 88 and 91. The length of the apertures 88 and 91 is calculated to shut off this beam of light when the aforementioned predetermined amplitude ratio is reached.

From the foregoing discussion, it will be apparent that by tuning the flywheel to the frequency of natural vibration of a predetermined critical speed of the crankshaft and knowing the damping coefficient of a rubber spring upon which the flywheel is mounted, the dimensions of an alarm system can be controlled such that a warning is given of impending destructive forced vibrations at the critical or resonance frequency of vibration. The actual alarm might be given in several ways, as is amply shown by the various embodiments of this invention which are described. Of primary importance in each instance, of course, is the idea that the relative amplitude of the flywheel and crankshaft be measured at resonance frequency and communicated to the operator when such amplitude reaches proportions indicative of approaching heavy stress in the crankshaft.

Although a rubber damping spring is shown, it will be understood that any damping material might be utilized. Furthermore, the device might be mounted on either end of the crankshaft or even adapted for mounting between the ends of the shaft. In such an instance, of course, the flywheel and damping spring would be considerably larger than shown in the embodiments depicted in the drawings.

In FIGURE 4 an alternately arranged damping spring in the form of a rubber disc is shown at 15. Such an arrangement might be used in any of the embodiments with the results obtained being identical with those of the sleeve-shaped rubber damping spring.

In the light of the foregoing discussion, it will be obvious that this invention should not be limited to the device shown but that many changes might be made in size, shape, number and disposition of parts without departing from the spirit thereof. For example, an electromagnetic sensing device might be used to detect the relative movement between the flywheel and the shaft. Such a device could include a permanent magnet on one of the flywheel and crankshaft and a coil on the other in the magnetic field of the permanent magnet. What is important is that a variety of sensing or detecting devices or systems might be utilized. Accordingly, it is intended that the foregoing description be illustrative only and not definitive and that the scope of the invention be limited only by the appended claims.

I claim:

1. An alarm system for detecting impending destructive forced torsional vibrations in a rotating crankshaft and signaling the pendency thereof comprising flywheel means having a natural frequency of vibration equal to a predetermined natural frequency of vibration of the crankshaft, said predetermined natural frequency of vibration being coincidental with a predetermined critical speed of said crankshaft, a support member extending from said crankshaft and fixed thereto for rotation and vibration therewith, spring damping means mounted on said support member, said flywheel means being carried by said spring means such that the vibrations of said flywheel are damped, said spring means having a damping coefficient calculated to produce a characteristic difference in amplitude of vibration between said flywheel means and said crankshaft at said critical speed and signal means extending between said crankshaft and said flywheel for indicating a characteristic difference in amplitude of vibration between said crankshaft and said flywheel at said critical speed.

2. The alarm system of claim 1 further characterized by and including bell means mounted on said support member for rotation therewith, said signal means including a striker arm adapted to contact said bell means when said characteristic difference in amplitude is reached.

3. The alarm system of claim 2 further characterized in that said striker means is pivotally mounted on said crankshaft and freely engages said flywheel such that said characteristic difference in amplitude of vibration causes said striker means to pivot about its pivot point to contact said bell means.

4. An alarm system for detecting impending destructive forced torsional vibrations in a rotating crankshaft and signaling the pendency thereof comprising flywheel means having a natural frequency of vibration equal to a predetermined natural frequency of vibration of the crankshaft, said predetermined natural frequency of vibration being coincidental with a predetermined critical speed of said crankshaft, a support member extending from said crankshaft and fixed thereto for rotation and vibration therewith, spring damping means fixed to said support member for rotation therewith, said flywheel means being fixedly mounted on said spring means, said spring damping means having a predetermined damping coefficient calculated to produce a characteristic difference in amplitude of vibration between said flywheel means and said crankshaft at said critical speed, and signal means extending between said rotating crankshaft and said flywheel means for indicating when said characteristic difference in amplitude is reached, said signal means including a striker arm mounted on said crankshaft for movement into and out of engagement with an alarm means, said striker arm being biased into said engagement by resilient means, detent means normally holding said striker arm out of engagement with said alarm means and cam means mounted on said detent means and extending into a slot in said flywheel means, said slot being of a predetermined length, said cam means being actuated by said notch means to release said detent means and permit said striker arm to contact said alarm means when said characteristic difference in amplitude is reached.

5. The alarm system of claim 4 further characterized by and including reset means for returning said striker arm into control of said detent means after said alarm is sounded.

6. An alarm system for detecting impending destructive forced torsional vibrations in a rotating shaft and signaling the pendency thereof comprising flywheel means having a natural frequency of vibration equal to a predetermined natural frequency of vibrations of the shaft, said predetermined natural frequency of vibration being coincidental with a predetermined critical speed of said shaft, spring means fixedly secured to said shaft, said flywheel means being mounted on said spring means and signal means extending between said rotating shaft and said flywheel for indicating a characteristic difference in amplitude of vibrations therebetween at said predetermined critical speed, said signal means includes a striker arm pivotally mounted on said shaft for movement into and out of engagement with an alarm means, said striker arm biased into said engagement by resilient means, detent means holding said striker arm out of engagement with said alarm means and cam means connected to said detent means and extending into operative engagement with said flywheel, said cam means being actuated to release said detent means when said characteristic difference in amplitude of vibration between said flywheel and said shaft is reached.

References Cited in the file of this patent

UNITED STATES PATENTS

| | | |
|---|---|---|
| 1,150,130 | Leitch | Aug. 17, 1915 |
| 1,318,638 | Anthon et al. | Oct. 14, 1919 |
| 1,571,349 | Summers | Feb. 2, 1926 |
| 2,219,298 | Dashefsky | Oct. 29, 1940 |
| 2,579,349 | Vrooman | Dec. 18, 1951 |
| 2,580,839 | Riopelle | Jan. 1, 1952 |
| 2,779,211 | Henrich | Jan. 29, 1957 |
| 2,972,904 | Troyer | Feb. 28, 1961 |
| 2,984,110 | Simek | May 16, 1961 |

FOREIGN PATENTS

| | | |
|---|---|---|
| 1,224,956 | France | June 28, 1960 |